May 8, 1956     J. R. BROWN     2,744,880
CORROSION-INHIBITING SOLUBLE PLUG
Filed Sept. 18, 1950
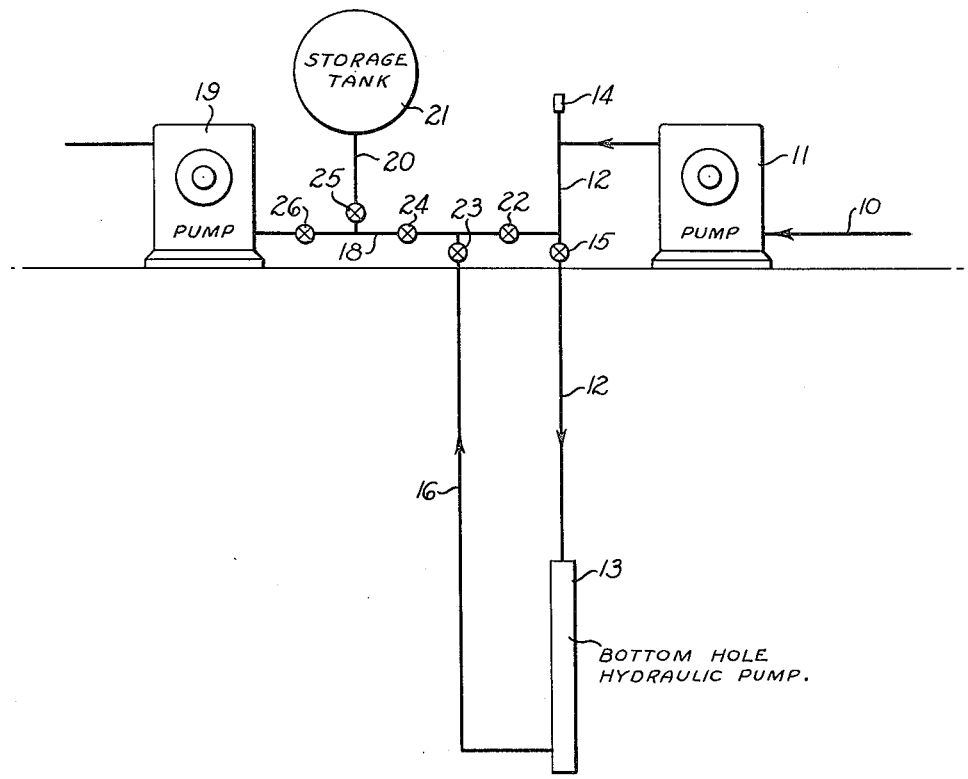
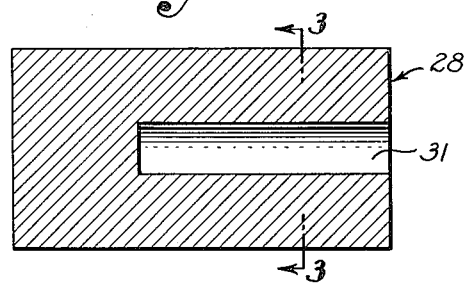
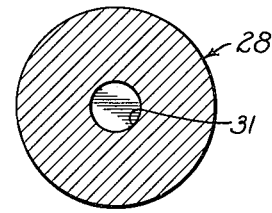
INVENTOR.
JOHN R. BROWN
BY HIS ATTORNEYS.
HARRIS, KIECH, FOSTER & HARRIS United States Patent Office 2,744,880
Patented May 8, 1956

2,744,880

CORROSION-INHIBITING SOLUBLE PLUG

John R. Brown, Inglewood, Calif., assignor, by mesne assignments, to Kobe, Inc., Huntington Park, Calif., a corporation of California Application September 18, 1950, Serial No. 185,435

14 Claims. (Cl. 260—41.5)

This invention relates to the cleaning and maintenance of liquid pipe lines, and the treating of liquids carried thereby, and, more particularly, to a soluble plug adapted to be conveyed through a pipe line to accomplish such purposes.

The invention has particular application in the oil industry in connection with pipe lines adapted to carry petroleum products, alone or mixed with water, and will therefore be described primarily in connection with such use. It is to be understood, however, that the invention has other uses, and that I do not intend to be limited to the particular uses described. Although for brevity I use the term "pipe line" throughout the application, it is to be understood that by such term I intend to include tubings, both surface and subsurface, lead lines, collecting lines, and power oil tubing adapted to supply a hydraulic pump set in an oil well, as well as other types of pipe lines.

In conveying liquid petroleum products, such as, for example, crude oil, refined oils, gasoline, and kerosene, in surface and subsurface pipe lines, considerable difficulty is encountered as a result of the normal deposition and accumulation of foreign matter on the inner walls of the pipe lines. In handling crude oils, such foreign matter may be paraffin wax or other waxy deposits which frequently form in such quantities as to substantially reduce the effective diameter of the tubing and, consequently, the capacity thereof. This occurs particularly frequently under cold temperature conditions existing in winter, and in any case is a source of much difficulty in maintenance of the pipe lines. Similarly, liquid petroleum products frequently contain substantial amounts of oil well brine, water, and other metal-attacking substances which may have a corrosive effect on the inner walls of the pipe lines, forming areas of pits and corrosion deposits, precipitated salt deposits and adsorbed organic and bacterial deposits which likewise tend to reduce substantially the flow capacity of the pipe line. Crude oil is produced with varying quantities of oil well brine, the percentage ranging from .1% to 99%, and, under certain conditions, it may result in severe corrosion of the pipe line walls with which it comes in contact.

In the past, it has been conventional practice to attempt to remove such undesirable foreign materials from pipe lines periodically by various means. For example, running mechanical scraping devices through the pipe lines has been a common expedient in the industry, but has caused great difficulty and inconvenience, as the scrapers must be retrieved from the line, and normal liquid conveyance must be discontinued during the cleaning operation. Another expedient conventionally employed to retard or remove wax deposits has been to heat the pipe lines, which, if long lines are involved, in many cases is wholly impractical. This is sometimes accomplished by passing steam through the pipe line, which has the added disadvantage of increasing corrosion due to condensation of water from the steam. Such conventional methods of dealing with the problem are uncertain of results, inconvenient, and in every case quite costly. In addition, so far as corrosion is concerned, such conventional cleaning methods must be repeated frequently, as corrosion commences again immediately the pipe line is put back in service following cleaning.

It is, therefore, a primary object of my present invention to provide means for removing such deposits of foreign materials from the inner wall of a pipe line, which can be used effectively during ordinary operation of the pipe line and without requiring any prolonged discontinuance of service during the cleaning operation. I prefer to accomplish this object by providing a soluble plug which can be passed through the pipe line by the fluid conveyed, and which is made of a substance soluble in the liquid normally conveyed by the pipe line so as to avoid any necessity of retrieving the plug from the line, and this is a further object of the invention.

As indicated above, corrosion of the inner walls of pipe lines is also a source of considerable difficulty in the oil industry. Since crude oil often contains a substantial amount of corrosive water, even new pipe lines are subject to corrosion. Such corrosion may be of the oxygen or hydrogen type or may be due to the action of aerobic or anaerobic bacteria commonly found in fluids produced from oil wells. It is a further object of the invention to provide such a soluble plug having incorporated therein a treating material, such as a corrosion inhibitor, which is released from the plug during its passage through the pipe line, and which is deposited upon the inner wall of the pipe line throughout its length so as to retard or inhibit the occurrence of corrosion products upon the wall.

As will be apparent from the foregoing, such a soluble plug provides an adequate carrier for the distribution of a treating material on the inner wall of a pipe line, or for the distribution of such a treating material into the column of liquid conveyed by the pipe line, as the soluble plug dissolves over a substantial period of time throughout its passage through the tubing, and this is a primary object of the invention. For example, lubricants, foam inhibitors, bactericides, and other treating materials, may be incorporated in such a plug to meet particular application needs, and this is a further object of the invention.

A further object of the invention is to provide such a soluble plug which is adapted to clean the inner wall of a pipe line and concurrently apply a corrosion inhibitor to the cleaned wall. Substantially simultaneous carrying out of both operations is important for best results in corrosion inhibition.

Still another object of the invention is to provide such a plug formed in part at least of a material which will gradually swell when immersed in petroleum so as to provide a continued wiping action on the pipe line walls as it passes therethrough, so that the plug material is mechanically deposited on the pipe line walls. This insures a good cleaning action and at the same time the deposit of a film of corrosion-inhibiting material on the walls.

Another object of the invention is to provide a soluble plug having a negatively charged protective material incorporated therein, which, as the plug dissolves, will be adsorbed by the positively charged anodic areas and will provide a protective film to reduce the rate of corrosion of the pipe line. A related object is to provide such a plug having incorporated therein a water-soluble substance which will react chemically with corroding anodic surfaces in the pipe line to form a relatively insoluble corrosion-protective film and to raise the pH of the water phase of the liquid conveyed so as to reduce the tendency to corrosion.

Other objects and advantages of the invention will be apparent from the following specification and the drawing, which are for the purpose of illustration only, and in which:

Fig. 1 is a diagrammatic utility view showing several applications of the invention;

Fig. 2 is a longitudinal sectional view of a preferred form of soluble plug of the invention; and Fig. 3 is a cross-sectional view, taken on the line 3—3 of Fig. 2.

Referring to the drawing, Fig. 1 shows several applications of the invention. In it, an inlet pipe line 10 is connected to the inlet of a pressure pump 11, the inlet pipe line being supplied by any source of fluid to be conveyed. The outlet of the pressure pump 11 is connected to a power oil tubing 12 which extends downwardly into an oil well and is connected at its lower end to a hydraulic pump 13 set in the well. The upper end of the tubing 12 is provided with a bull plug 14 removably threaded into the upper end thereof. A suitable manually operable valve 15 is provided in the line of the power oil tubing 12. As is well known in the art, the pump 11 is adapted to supply clean crude oil under pressure through the power oil tubing 12 to operate the hydraulic pump 13 to pump well fluid from the well upwardly through a production tubing 16 and into and through a pipe line 18. The pipe line 18 may lead to the inlet of a second pressure pump 19 adapted to act as a relay pump to convey the well production farther through an appropriate pipe line system. As shown, there is a branch pipe line 20 leading to a storage tank 21. Suitable valves 22, 23, 24, 25, and 26 are provided to control fluid flow. The essence of the system resides in a pipe line, regardless of how positioned or placed, adapted to carry a fluid flow, and means, such as the bull plug 14, adjacent the upstream end of the line for permitting the line to be opened to receive a soluble plug 28 as hereinafter described.

A preferred form of the soluble plug element 28 is illustrated in Figs. 2 and 3, it being generally cylindrical in form and provided with a central cavity 31 which extends longitudinally a portion of the way through the plug element. The cavity may be cylindrical in form, and may extend for approximately two-thirds of the length of the plug element and have a diameter approximately one-fourth the diameter of the plug element, although other dimensions may be used if desired. The cavity 31 may be omitted if desired, its primary purpose being to increase the surface area of the plug or to reduce the amount of material in the plug, or both, where appropriate conditions of use so dictate. The plug 28 is adapted to fit snugly within the tubing 12, external diameter of the plug being substantially the same as the internal diameter of the tubing. For the purpose of simplicity of illustration, the tubing 12 and the pipe lines 18 and 20 have the same internal diameters so that the plug 28 will closely fit in all thereof.

The soluble plug 28 of my invention is preferably formed of an oil-soluble plastic binder which is strong enough to clean waxy deposits from tubing 12 and pipe lines 18 and 20, and yet sufficiently flexible to conform to abrupt changes in direction of the tubing and pipe lines. Although naphthalene balls or soap may be employed for this purpose, I have found most suitable a rubber wax blend, such as Goodyear "Pliowax," which consists of approximately equal portions of a cyclized GR-S type synthetic rubber "emulsion" and petroleum paraffin wax mixed together to a homogeneous mass at elevated temperatures approximately 160° F. to 190° F.

The GR-S designation referring to the synthetic rubber signifies "Government Rubber-Styrene" which is a very well known synthetic rubber. The word "emulsion" is used here to signify the material known by the trade name "Pliolite." "Pliolite" is a cyclized rubber produced from crepe rubber, and both natural crepe rubber and synthetic GR-S crepe rubber have been used for this purpose. As stated in "The Chemistry and Technology of Waxes" by Warth (1947), pages 292–293, "Pliolite" is a synthetic derivative of rubber produced by a cyclizing process as the result of a reaction between crepe rubber and a tin salt, such as stannic chloride, or chlorostannic acid. It has the same chemical composition as the crepe rubber from which it is derived, but it differs in its structural formula. The aggregation of the isoprene ($C_5H_8$) molecules is cyclic in the resultant "Pliolite." The above preparation of "Pliolite" is described by Warth as a process which "involves dissolving the rubber with a suitable solvent to form a heavy viscous, non-drying cement. The rubber cement is then placed in a jacketed reactor equipped with a reflux condenser and heated for a period of time with a reactant and catalyst; e. g., hydrochloric acid and anhydrous stannic chloride. During this heating period an enormous reduction in the viscosity of the solution is experienced and a physical change is effected from the usual rubber into the resinous state. The reaction is stopped by water and the resin is recovered from the solvent as a finely divided powder which is vacuum dried. The powder is milled to yield solutions which will produce heat-sealing film materials, but if admixtures of 'Pliolite' and wax are desired, where wax is to predominate, it has been found that the 'Pliolite' resin powder very readily dissolves in most of the common waxes, by a process of heating the wax and then adding the unmilled resin." The described "Pliowax" is produced from the "Pliolite" resin by combining it with paraffin wax in varying proportions as desired to obtain any required melting point or solubility in petroleum oils. For example, it may contain 20% to 30% of the "Pliolite" resin, especially where the "Pliolite" is made from natural crepe rubber. As also stated in the above cited reference work (page 293): "The addition of unmilled 'Pliolite' resin to a paraffin melting at 135° F. is said to increase the melting point of the paraffin about 3° F. for every 5% of 'Pliolite' added. 'Pliowax' containing 25% of milled 'Pliolite' (Goodyear Tire & Rubber Co., Inc.) has a melting point of 56° (132.8 F.). . . . 'Pliowax' may be diluted with further quantities of wax simply by melting the materials together. This is best accomplished at temperatures not over 180 or 190° F. to prevent deterioration. . . . Instead of fusing unmilled 'Pliolite' with wax by heating them together, the wax is incorporated in milled 'Pliolite' on mixing rolls, or in a Banbury mixer" (page 294). Also, "Pliowax" may contain approximately equal proportions of "Pliolite" and paraffin wax, as above stated, when the "Pliolite" is produced from GR-S synthetic rubber, such as 40% or 50% of "Pliolite." Thus, various "Pliowaxes" containing paraffin wax and milled or unmilled "Pliolite" are obtained, and these are usable for the present invention, wherein any one serves as a binder.

This binder is soluble in crude oil normally carried in the pipe line 18 and constitutes a negatively charged protective material. Such "Pliowax" has the additional desirable characteristic of gradually swelling substantially when immersed in petroleum fluids, it being capable of swelling to three to four times its original volume. Technically the reacted "Pliolite" resin used in "Pliowax," and which is described by Warth in the above cited text as being "milled to yield solutions," may be considered as an "emulsion," as I have used the term above, because of its resultant colloidal condition. Although I refer to such "Pliowax" as soluble in the petroleum fluid, it is soluble only in the sense that it is dispersible in the fluid. Due to its rubber component, it swells as described until it attains a flaccid, jellylike consistency, when it loses its mechanical strength and disperses into the fluid.

Since the dispersion of "Pliowax" in the petroleum fluid occurs to the degree of complete dissolution, the term "soluble" is appropriate and accurate, as may be easily demonstrated in the laboratory. When one gram of the styrene rubber-paraffin wax binder is mechanically dispersed in 100 cc. of a typical petroleum oil, such as 34° API California Crude Oil, the binder is dissolved so completely that on microscopic examination after eight hours at 130° F., it is difficult to detect any evidence of the binder in the mechanical suspension range. The petroleum oil does exhibit Brownian motion indicating that some of the particles are dispersed in the colloidal range. The plug 28 is also compounded with a cathodic rust inhibitor such as calcium carbonate and a water-soluble, anodic-type corrosion inhibitor, as, for example, tribasic sodium phosphate, sodium chromate, sodium carbonate or sodium silicate. Cathodic corrosion terminology as used in this application is taken directly from the following references: Speller, "Corrosion Causes and Prevention (1926)", page 543, McGraw-Hill Book Company, New York, N. Y.; and H. H. Uhlig, "Corrosion Handbook (1948)", p. XXVI, also see pp. 906–907. For the anodic inhibitor, it is also possible to use alkalated naphthalene sodium sulfonates, sulfonated mineral oils, or other powdered oil or water-soluble metal surface active agents, as well as water-soluble amines. The corrosion inhibitors are distributed in compounding as uniformly as possible throughout the plastic binder to form a homogeneous mass.

Although the proportions of corrosion inhibitors employed may be varied over a considerable range to conform to various applications of the plug 28, for typical applications I prefer to use the following ingredients in approximately these proportions:

100 parts by weight of the Goodyear Pliowax combined by milling with 35 to 40 parts by weight of calcium carbonate and 10 to 15 parts by weight of tribasic sodium phosphate.

The rubber component functions as a corrosion inhibitor by forming an insulating film on the anodic areas of the pipe line, thus reducing the exposure of the material to direct contact with electrolyte. The calcium carbonate acts as a corrosion inhibitor by stifling cathodic electrode reactions of corrosion cells. This action minimizes the formation of hydrogen. The tribasic sodium phosphate reduces corrosion of the anodic electrodes of the pipe line micro-corrosion cells by chemical reaction with the metal to form iron phosphate. It also acts to increase the pH of the fluid electrolyte and assists in the precipitation of the calcium carbonate inhibitors from the soluble plug and from the fluid electrolyte.

By increasing or decreasing the proportion of the corrosion inhibitors compounded in the plug, it is possible to decrease or increase, respectively, the oil solubility rate of the plug and the rate at which the plug swells over a large range of values. In addition, the rate of application of the corrosion inhibitors may be varied considerably to provide a greater range of corrosion protection for the pipe line; however, the exemplary composition stated above has been found satisfactory for most uses.

In the preferred use of the soluble plug 28, it is inserted into the pipe line to be cleaned downstream from the pumping unit. Thus, as shown in Figure 1, the ball plug 14 may be removed, the soluble plug 28 inserted into the power oil tubing 12, and passed downwardly therethrough to a point at which it can be picked up by a flow of pressure fluid delivered by the pressure pump 11, following which the bull plug is put back in place to close the upper end of the power oil tubing. The operation of the pressure pump 11 is then commenced, delivering fluid under high pressure to the power oil tubing 12 behind the soluble plug 28, and, since the initial clearance between the plug and the interior walls of the pipe line limits the flow of fluid past the outside surface of the plug, the plug is swiftly carried by the fluid flow to the point in the tubing where wax or other deposits are normally causing a restriction of flow therethrough. As the plug 28 proceeds through the tubing 12, the abrasive action of its periphery with the internal wall of the tubing and the solvent action of the fluid conveyed in the tubing, tend to soften the outside surface of the plug, thereby distributing the corrosion-protective coating and inhibitors along the inner wall of the tubing.

The corrosion-protective coating and inhibitors are deposited upon the inner wall of the tubing 12 in several ways. First, as the plug passes through the tubing, mechanical abrasion transfers its material to the inner wall of the tubing, providing a thin film of protective plug material thereon. As the plug gradually continues to swell during its passage through the tubing, contact is maintained automatically between its periphery and the wall of the tubing. The rate of swelling of the plug 22 is a function of its constituent ingredients as well as its surface area. The larger the surface area, the faster the swelling. Also, the lower the percentage of "Pliowax" employed, the slower the swelling. The rate of solubility of the plug depends upon the same factors. Consequently, by varying the percentage of the basic binder or the surface area of the plug, or both, the rate of plug swelling and solubility may be varied through a wide range. Secondly, as the plug binder is dissolved by solvent action of the petroleum fluid, the cathodic and anodic corrosion inhibitors are released into the oil stream.

The cathodic-type corrosion inhibitor, such as calcium carbonate, is dispersed in the fluid and tends to precipitate out, as a protective deposit, at cathodic areas due to the rise in fluid pH produced by the cathodic corrosion reaction. The chalky calcium carbonate deposit will stifle the corrosion at these points and may react with the produced iron salts to form a calcium-iron complex protective deposit. The anodic inhibitor, such as tribasic sodium phosphate, dissolves in the water phase and is carried thereby to anodic surfaces within the tubing 12 where it reacts chemically to form a sparingly soluble, corrosion-protective iron phosphate film. The anodic inhibitor also raises the pH of the water phase, thus generally reducing the tendency of the fluid toward corrosion.

When the oil-soluble binder has completely dispersed, the rust-inhibiting components will either be carried in fluid solution or will have precipitated out as corrosion-protective coatings along the line of travel and no interference with normal pumping operations is experienced. Moreover, no problem of retrieving is encountered in view of the dissolution of the plug. As will be understood, if the plug 28 dissolves before cleaning out substantially all of the wax deposits in the tubing 12 and providing adequate corrosion inhibition thereto, additional plugs may be sequentially inserted into and carried through the tubing to finish the cleaning and corrosion-inhibiting operation, all of them dissolving in the fluid flow eventually.

As will be apparent to those skilled in the art, the plug 28 may also readily be used to clean and provide corrosion inhibition in the pipe lines 18 and 20, which are normally on the surface of the ground. To treat the entire length of the pipe line 18, the valves 15, 23, and 25 are closed, and the valves 22 and 26 are opened. The plug 28 is inserted by removal of the bull plug 14 as described above and the pressure pump 11 is then employed to pump fluid, and the soluble plug 28, through the pipe line 18 to obtain the same results as described above with regard to the power oil tubing 12. If it is desired to similarly treat the pipe line 20, the valve 26 is closed and the valve 25 is opened and the fluid flow and soluble plug are then directed through the pipe line 20. The tubing and pipe line system illustrated in Fig. 1 may be varied as desired, and, in fact, the soluble plug 28 may be employed in any suitable pipe line as desired.

By slight changes in the basic composition of the plug 28, it may be used not only to remove waxy deposits and other materials and provide corrosion protection, as described above, but for other specific applications. For example, the plug 28 may be compounded to include a microbiological corrosion inhibitor therein, which will be released during movement of the plug through a pipe line, to inhibit and reduce bacterial deposits within the pipe line. Many chlorinated or amine type bactericides may be used for this purpose but we prefer to use materials that do not add to the corrosive atmosphere within the pipe line and those that are particularly effective against anaerobic bacteria. Also, the type bactericide can be selected to fit specific types of installations and thereby offer a wide range of bacteria control. However, the use of .2% of an acridine derivative such as 3,6 diaminoacridine hydrochloride has been found satisfactory for most applications, being especially effective against anaerobic bacteria.

Also, such a soluble plug may be readily utilized to distribute lubricating materials into the fluid flow passing through the pipe line in order to lubricate pumps such as the pumps 13 or 19 shown in Figure 1, or other working parts with which a pipe line flow comes in contact. In this connection, I prefer to incorporate in the soluble plug 28 by distribution therethrough in manufacture, suitable solid lubricants or metal wetting agents either oil or water soluble. In such use, I prefer to add to the basic ingredients of the soluble plug approximately two per cent by weight of solid oil-soluble Santomerse, an alkylated arylsulfonate, although other suitable greases or wetting agents may be added in the place of the Santomerse or in combination therewith. Such material will be liberated into the pipe line flow as the plug dissolves in its passage therethrough and will thus be carried to the hydraulic pump 13, or other working parts, and lubricate same. As the rate of solubility of the plug 28 can be controlled within determinable limits by control of the composition of the plug, as suggested above, the liberation of the lubricating material into the fluid flow may also be controlled accurately enough to provide suitable lubrication to such a pump or other working parts. The addition of such wetting agents also is conducive to the formation of a thin film of oil on the metal walls of a pipe line, which also tends to protect it against corrosion from the water phase of the fluid carried by the line. This is accomplished, as will be understood, by the action of such wetting agents reducing the surface tension of the petroleum fluid carried by the pipe line.

A further alternative embodiment of the invention is to incorporate in the basic plastic composition of the soluble plug 28 a suitable oil-soluble foam inhibitor such as, for example, Dow Corning Silicone DC–500, which is the trade name for polydimethysiloxane having a viscosity of 50 centistokes at 25° C. or 185 Saybolt seconds at 100° F. This foam inhibitor, which is milled into the body of the plug, is released into the fluid flow in a pipe line during passage of the plug therethrough and while the plug is dissolving in the fluid flow, to inhibit the formation of foam. Similarly, such a soluble plug incorporating a foam inhibitor may be profitably employed in the power oil supply line leading to the hydraulic pump 13 in which the power oil supply is ultimately discharged into the production column 16 to provide a uniform feed of such foam inhibitor to the production column to inhibit the formation of foam therein. Also, such a soluble plug containing a foam inhibitor may profitably be employed to convey the foam inhibitor into an oil well below a hydraulic pump to treat the well fluid before it enters the pump, as generally disclosed in the patent to C. J. Coberly, No. 2,368,346, issued January 30, 1945. The same sort of system may be employed to convey a microbiological corrosion inhibitor, as described hereinabove, into the well fluid standing in an oil well to inhibit the corrosive action of bacteria before the well fluid enters a pump or tubing.

Although I have described a preferred and several alternative embodiments of the invention, I do not intend to be limited thereto, but desire to be afforded the full scope of the following claims.

I claim as my invention:

1. A cleaning plug insertable into an oil pipe line and to be passed therethrough in engagement with the inner walls thereof to remove by mechanical action deposits on inner surfaces of the pipe line, such plug including: a normally solid binder body of oil-soluble material capable of slow dissolution over a long period of time in liquid petroleum products encountered in said pipe line; and a solid mineral constituent distributed in said body in proportion of about 35 to 40 parts by weight to each 100 parts by weight of said binder, said solid mineral constituent having the two properties of abrasiveness to clean mechanically interior surfaces of said pipe line upon passage therethrough and of inhibition of corrosion of such surfaces after passage thereover.

2. A plug as in claim 1 containing also a minor proportion of an anodic corrosion inhibitor.

3. A plug as in claim 2 wherein said anodic inhibitor is present in amount approximating 10 to 15 parts by weight to each 100 parts by weight of said binder.

4. A plug as in claim 3 wherein said mineral constituent is calcium carbonate.

5. A plug as in claim 3 wherein said anodic inhibitor is a phosphate capable of yielding a protective iron-phosphate.

6. A plug as in claim 5 wherein said phosphate inhibitor is a polybasic sodium phosphate.

7. A plug as in claim 2 wherein the anodic inhibitor is trisodium phosphate.

8. A plug as in claim 1 wherein the mineral constituent is calcium carbonate.

9. A plug as in claim 1 wherein said binder is paraffin wax having blended therein a cyclized rubber derivative not exceeding the weight of the wax.

10. A plug as in claim 9 wherein said derivative is from synthetic rubber.

11. A plug as in claim 9 wherein said derivative is from GR-S synthetic rubber.

12. A plug as in claim 1 containing approximately 2% of a metal-wetting agent.

13. A plug as in claim 1 containing approximately 2% of a metal-wetting agent in the form of an alkylated arylsulfonate.

14. A plug as in claim 1 containing approximately 0.2% of a bactericide for anaerobic bacteria.

References Cited in the file of this patent

UNITED STATES PATENTS

| | | |
|---|---|---|
| 616,696 | Cochran | Dec. 27, 1898 |
| 823,941 | Fetta | June 19, 1906 |
| 1,756,378 | Aberhuber | Apr. 29, 1930 |
| 1,903,041 | Hull et al. | Mar. 28, 1933 |
| 1,910,579 | Twiss | May 23, 1933 |
| 1,994,551 | Weis | Mar. 19, 1935 |
| 2,276,109 | Smith | Mar. 10, 1942 |
| 2,352,805 | Scheuermann et al. | July 4, 1944 |
| 2,411,044 | Landrum et al. | Nov. 12, 1946 |

FOREIGN PATENTS

| | | |
|---|---|---|
| 123,193 | Austria | Mar. 10, 1942 |

OTHER REFERENCES

Metallic Corrosion Passivity and Protection, by Evans, pages 300–302, 534, 535, 556–558.